W. WENDERHOLD.
PHOTOGRAPHIC PRINTING APPARATUS.
APPLICATION FILED SEPT. 19, 1917.

1,312,289.

Patented Aug. 5, 1919.
2 SHEETS—SHEET 1.

INVENTOR
William Wenderhold

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

PHOTOGRAPHIC-PRINTING APPARATUS.

1,312,289.  Specification of Letters Patent.  Patented Aug. 5, 1919.

Application filed September 19, 1917. Serial No. 192,071.

*To all whom it may concern:*

Be it known that I, WILLIAM WENDERHOLD, a citizen of the United States, residing at New York city, in the county and State of New York, have invented certain new and useful Improvements in Photographic-Printing Apparatus, of which the following is a clear, full, and exact description.

This invention relates to an improvement in photographic printing apparatus.

The object of my device is to provide means whereby evenly illuminated positive prints may be obtained from a number of successive negative pictures, although they may not be of equal density in their exposure.

Another object is to provide such illumination control to be entirely automatic, being controlled by the density of the picture on the negative film.

Referring to the drawings.

To accomplish the objects desired, I employ selenium cells. Their action upon electric currents when exposed to light is well known to those skilled in the art, and the action of these cells when so exposed to light is the medium I use to accomplish the objects in view.

Figure 1:
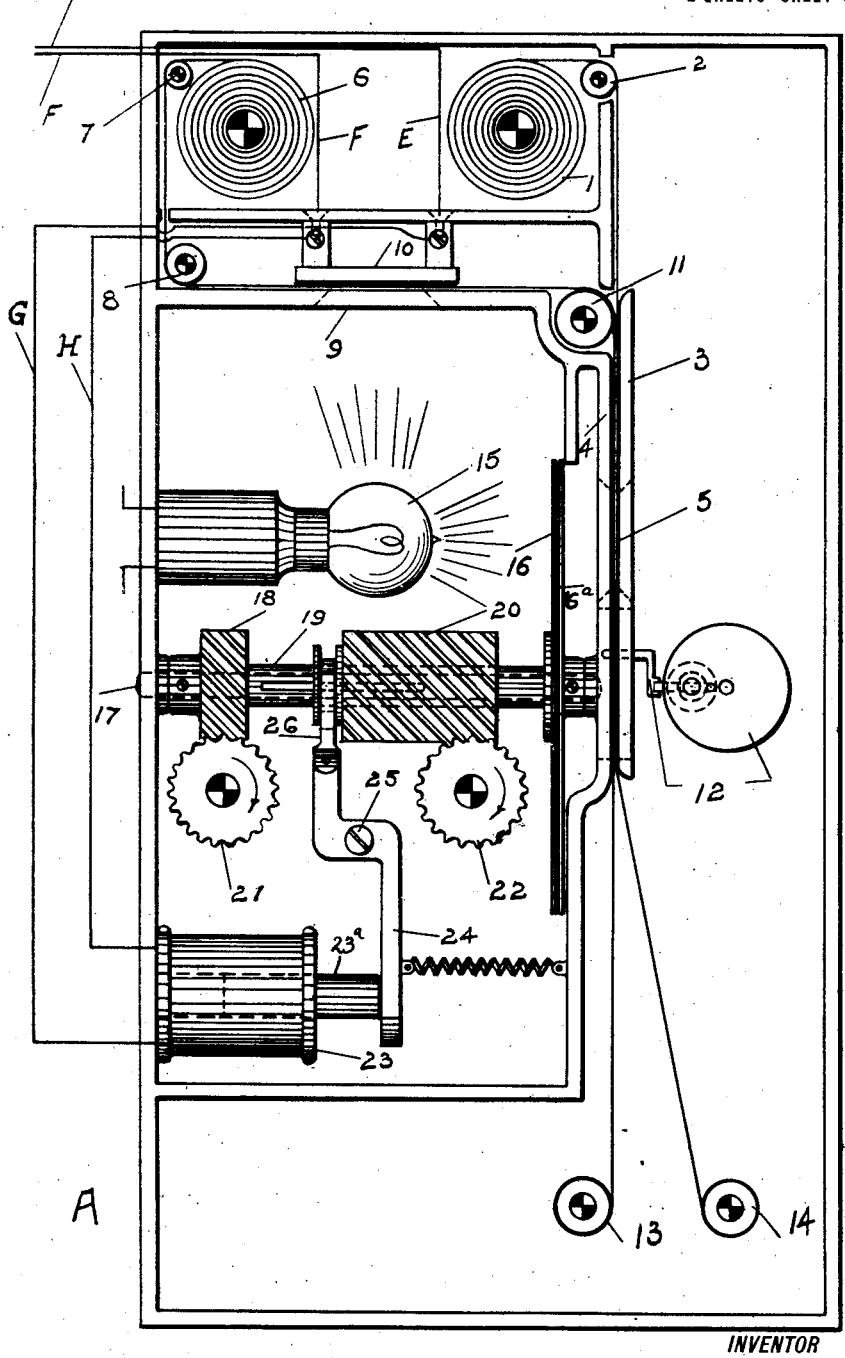
Figure 1 is a side elevation of the apparatus.
Figure 2:
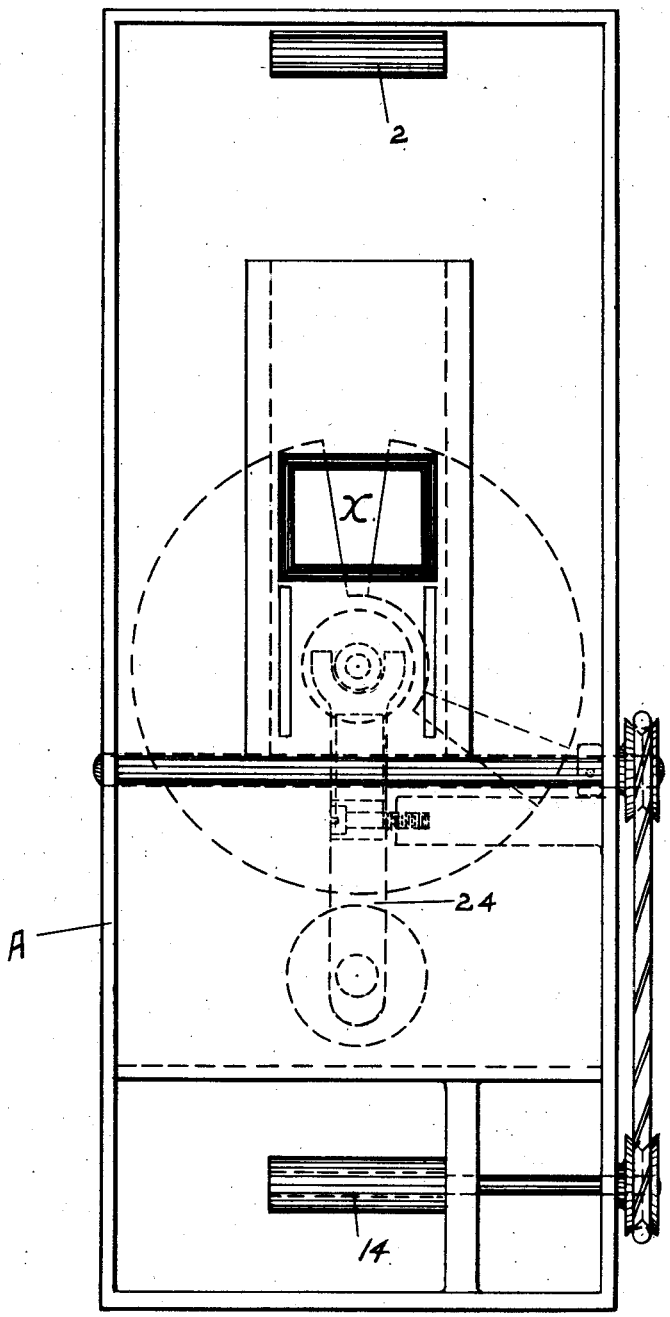
Fig. 2 is a rear elevation showing the aperture in which the printing is to take place.

As shown in Fig. 1, A is the supporting frame for the entire apparatus. The unexposed positive film roll 1 is mounted in a light proof chamber, and the film is drawn therefrom over the guide roller 2 down between the guide 4 and passes aperture 5. The negative film is mounted in a roll 6 and is drawn from there over guide rollers 7 and 8 and past an aperture 9, and also past the selenium cells 10 which are behind the aperture 9. From there the negative passes over guide roller 11 and from thence passes the aperture 5. It is then moved by an intermittent motion device 12 together with the positive film 1, and thereafter the negative is wound on roll 13, and the positive onto roll 14. The light source 15 illuminates the apertures 5 and 9. The rotary shutter interrupts the illumination of aperture 5, while the films are being moved by the intermittent movement 12. This shutter consists of two plates 16 and 16ª. The plate 16ª is fastened onto shaft 17 on which is also fastened the spiral gear 18. The shutter blade 16 is fastened to a tube shaft 19 upon which is slidably mounted the spiral gear 20. When this spiral gear 20 is moved back or forth it alters the relative position of the shutter blades 16 and 16ª to each other, thereby enlarging or decreasing the opening X in the shutters (see Fig. 2) and consequently the amount of illumination that passes through the negative onto the positive. Both shutter blades revolve in the same direction and are driven by gears 21 and 22.

The shifting of the gear 20 is controlled by the negative, and especially by the amount of light that passes through the negative onto the selenium cells in aperture 9. The selenium cells 10 are interposed in the electric circuit coming over wires E—F, and G—H. The wires G—H furnish current to the solenoid 23 which operates the lever 24, which lever is pivotally mounted on point 25 and has a fork 26 operating the spiral gear 20 according to the actions of the solenoid upon the member 23ª which is made of any metal that is easily attracted by a magnetized member. Plunger 23ª is fastened to the lever 24 in a suitable manner.

If the illumination in aperture 9 on passing through the negative is great, then the selenium cells are highly illuminated and consequently will allow a greater amount of current to pass through the solenoid which will attract plunger 23ª, together with lever 24 and move the gear 20. Consequently the opening X in the shutter between blades 16 and 16ª is reduced, and vice versa. Thus the amount of illumination for the positive is controlled and equalized by the negative itself. The same arrangement can be applied to cameras by employing two lenses, one to take the picture, and one to control selenium cells which in turn control the opening of the shutters behind the lens for taking pictures.

What I claim as my invention is:

1. In a photographic printing apparatus, the combination with a negative film, of means for guiding and simultaneously moving said negative film and an unexposed positive film, a source of light for effecting the exposure of said unexposed film, a shutter positioned between said source of light and said films, and means controlled by the density of the negative film to the light from said source for regulating the opening of said shutter.

2. In a photographic printing apparatus, the combination with a negative film, of means for guiding and simultaneously moving said negative film and an unexposed positive film, a source of light for effecting the exposure of said unexposed film, a shutter positioned between said source of light and said films, and electrically operated means controlled by the density of the negative film to the light from said source for regulating the opening in said shutter.

3. In a photographic printing apparatus, the combination with a negative film, of means for guiding and simultaneously moving said negative film and an unexposed positive film, a source of light for effecting the exposure of said unexposed film, a shutter positioned between said source of light and said films, a selenium cell, said negative film being interposed between said selenium cell and said source of light, said cell being influenced by the density of the negative film to the light from said source, and means controlled by said selenium cell for regulating the opening of said shutter.

4. In a photographic printing apparatus, the combination with a negative film, and means controlled by the density of the negative film for automatically varying the area of light transmitted to the unexposed film to produce thereby an evenly illuminated positive film irrespective of variations in density of the negative film substantially as shown and described.

Signed at the city of New York, New York, this 12th day of September, one thousand nine hundred and seventeen.

WILLIAM WENDERHOLD.